April 13, 1937. O. A. MORGENSTERN 2,076,857
ALTERNATING CURRENT MAGNET
Filed Dec. 23, 1933
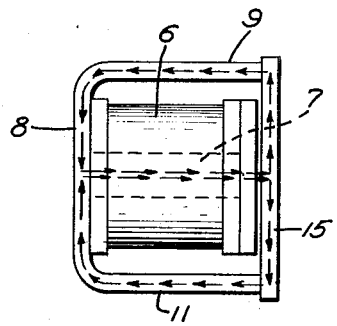
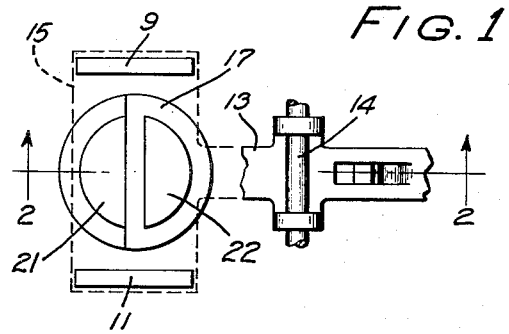
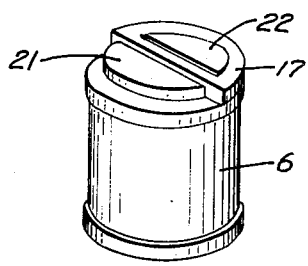
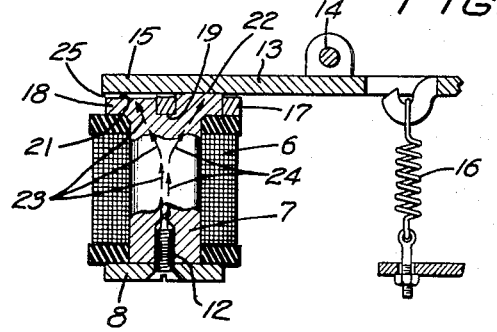
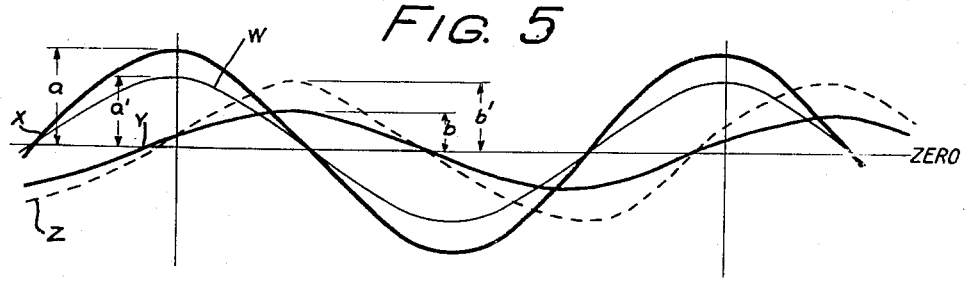
INVENTOR
OSCAR A MORGENSTERN
BY J.H.B.Whitfield
ATTORNEY Patented Apr. 13, 1937

2,076,857

UNITED STATES PATENT OFFICE 2,076,857

ALTERNATING CURRENT MAGNET

Oscar A. Morgenstern, Chicago, Ill., assignor to Teletype Corporation, Chicago, Ill., a corporation of Delaware Application December 23, 1933, Serial No. 703,706

1 Claim. (Cl. 175—338)

The present invention relates to improvements in electromagnets and especially to electromagnets that are responsive to alternating current control and are adapted to be used in connection with telegraph signaling systems.

A main object of the present invention is to increase the magnetic force and to improve thereby the operating efficiency of alternating current electromagnets operating under certain electrical and mechanical conditions.

It is well known that in electromagnets suitable for alternating current in which there is provided a main flux and an out-of-phase flux, also referred to as a principal and a secondary flux, the latter or secondary flux is inherently accompanied by a condition of relatively greater reactance, so that its force is frequently so inferior to that of the main or principal flux as to permit of a slight chattering or vibration in the armature under the urge of the return spring. This undesirable condition prevails essentially because the force of the return element, usually a spring, overcomes the pull exerted by the secondary or out-of-phase flux during the current reversals and when the principal flux passes through zero.

Accordingly, a feature of the present invention is to create a secondary or out-of-phase flux and its corresponding electromagnetic force to approximate that of the principal force, so that the armature adjustment and particularly the tension of its spring may be conveniently adjusted to a single standard corresponding to the relatively more similar characteristics of the two fluxes.

Another feature of the present invention in attaining this object by having main and out-of-phase fluxes is the provision of means for increasing or accentuating the out-of-phase flux with respect to the main flux, so as to permit the use of relatively more powerful return elements before encountering a condition which is manifested by a chattering or humming of the armature.

In addition to the foregoing recited objects, the present invention has for its purpose the provision of an electromagnetic structure that may be manufactured simply and economically.

It is contemplated, in accomplishing the several objects of this invention, to provide a solid core field magnet having a cylindrical central leg about which the exciting coil may be wound conveniently and which itself may serve as a mandrel, if preferred, or about which a coil may be quickly and easily placed. The cylindrical leg preferably comprises the central one of a three-legged or E-shaped field magnet, the faces of which may lie in the same plane. A spring tensioned armature may engage the several faces so that upon energization, two magnetic paths are created, as described in accordance with the details following hereinafter.

To create a sluggish or out-of-phase flux, a portion of one of the legs is encircled by a shadowing coil or ring which is preferably applied on the central or cylindrical leg through which all of the magnetic lines must pass, a portion of the lines passing through the unshaded area of the central pole face and a portion through the shaded area. To increase the flux which passes through the shaded area of the central pole surface, the unshaded portion thereof is ground down a suitable distance so as to increase the gap between itself and the armature, thereby introducing a reluctance to the main or unshaded flux and forcing a greater portion of the magnetic lines through the out-of-phase flux circuit.

For a more comprehensive understanding of the present invention, reference should be had to the accompanying drawing in which:

Fig. 1 is a plan view of an electromagnet embodying the principles of the present invention and having associated therewith an armature, a portion of which is broken away for the sake of clearness;

Fig. 2 is a transverse sectional view taken approximately on line 2—2 of Fig. 1;

Fig. 3 is an end elevational view of the structure illustrated in Fig. 1, having indicated thereon diagrammatically, the approximate paths described by the principal magnetic lines;

Fig. 4 is a perspective view of the exciting coil, featuring the shadowing ring applied thereon, and Fig. 5 is a curve chart illustrating the several magnetic forces to make more comprehensive the detailed description following hereinafter.

In the illustrations, the reference character 6 indicates generally a winding of an exciting coil for energizing an electromagnet 7. In telegraph exchange systems, coils of this type frequently are employed to start the transmission of electrical impulses or to control the synchronization in start-stop systems. In order to permit a sharp staccato action, the armature members associated with coils employed for these purposes must necessarily be equipped with a relatively strong spring and preferably adjustable. Telegraph signaling magnets of this type are also preferably designed with a single winding, such as that herein disclosed.

The magnet 7 comprises the central leg of an E-shaped field magnet, the other legs of which are formed by the association therewith of a U-shaped member 8. The outer legs of the resulting E-shaped structure are indicated by the reference characters 9 and 11. The assembly is held together by a screw 12 so as to present the faces of the several legs 7, 9, and 11 in a common plane, as indicated in Fig. 3. An armature member 13 is pivoted at 14 and is formed with a transversely disposed portion 15 which cooperates with the several faces of the legs 7, 9, and 11. An adjustable tension spring 16 tends at all times to exert a predetermined force upon the armature 13, seeking to rotate it clockwise, as viewed in Fig. 2, in opposition to the magnetic attraction created by the energization of the coil 6.

In order to make this structure particularly adaptable to the use of alternating current potentials for the energization of the coil 6, the magnetic force created thereby is divided into a principal and a secondary force operating in successive relationship, as indicated by the curves in Fig. 5. This division is accomplished by the introduction of a shadowing ring 17 shaped to resemble the character D which encircles a portion of the pole surface of the central leg 7, Fig. 4. In order not to diminish the pole surface area, the leg 7 is enlarged at its end, as indicated at 18, Fig. 2, and slotted centrally as at 19 to admit the straight side of the ring 17. As a result, the pole surface of the central leg 7 is divided into two portions, indicated 21 and 22, the former of which will be referred to hereinafter as the unshaded surface and the latter as the shaded surface.

In the curve chart, Fig. 5, the amplitude of the magnetic fluxes and/or their respective forces is indicated in a vertical direction and the time in a horizontal direction. The normal phased relationship of the principal and out-of-phase fluxes is illustrated by the curves X and Y, in solid lines. Thus, it may be seen that at no time do both of these curves coincide at the zero position, but that the curve Y is maintained with a constant lag behind the principal curve X. As a result of the shadowing coil 17, a counter-force is set up to the magnetic force in the shaded pole area 22, correspondingly diminishing the secondary or out-of-phase flux, as indicated by the amplitude $b$ of the out-of-phase flux in comparison with the amplitude $a$ of the principal flux.

Since it is most desirable to acquire a sharp, well defined action in the return movement of the armature, a relatively strong return spring is preferably employed. The tension of the return spring will be limited by the magnitude of the secondary force since of the two forces it is essentially the weaker. By balancing the primary and secondary fluxes or by increasing the secondary flux to more nearly approximate that of the primary flux, a correspondingly stronger return spring may be employed before encountering the point at which the armature will recede from its energized position to cause a chattering in accordance with the frequency of the current reversals.

To accomplish this, the face 21 is ground down or cut away, introducing a gap 25 in the path of the principal flux 23, thereby increasing its reluctance and deflecting a portion of the magnetic lines which would otherwise travel the path 23 to instead follow the direction of the alternative path 24. This increase in the magnetic lines in the path 24 may be represented by the dotted line curve Z in Fig. 5 which is approximately in phase with the old curve Y, but which is maintained at an increased amplitude $b'$. As a result, of course, the amplitude $a$ of curve X is proportionately diminished as indicated by the curve W and approaches the level of the amplitude $b'$.

Thus, by equalizing or at least reducing the contrast between the forces traveling the paths 23 and 24, the relationship between either of them and the spring 16 may be maintained more nearly constant, allowing an increase in spring tension which will not produce a chatter of the armature, a condition which is highly deleterious in the maintenance of telegraph signaling apparatus. It may be especially noted that in accordance with the construction of the magnet indicated in the accompanying drawing, there is obtained a rigid assembly and relationship between the winding, the field core, and the legs of the magnet, and that this construction lends itself particularly to efficient manufacturing practices and assembly.

While the present invention has been explained and described in connection with a particular embodiment thereof, it should be noted that numerous modifications and variations may be made without departing from its spirit or scope. For this reason it is not intended to be limited to the specific disclosure in the accompanying drawing nor to the language of the foregoing specification, but to be permitted instead a latitude of interpretation, as indicated by the hereinafter appended claim.

What is claimed is:

An alternating current electromagnetic device comprising a magnetic element having a U-shaped member, the vertical sides of said U-shaped member affording parallel pole legs, a central member secured to said U-shaped member intermediate said sides, said central member and pole legs having pole faces in a common plane and said central member having an enlarged cylindrical pole head channeled in a direction transversely of said pole legs to divide the head into two semicircular pole faces, an armature pivoted on an axis parallel to the channel in said head and rotatable to engage said pole faces simultaneously, a shadowing ring encircling the semicircular pole face of said central member nearest the pivot of said armature for establishing a displaced or secondary magnetic circuit therethrough, and means for introducing a reluctance into the path of a principal magnetic circuit to deflect the magnetic lines of force into the secondary or displaced magnetic circuit comprising a projecting encircled pole face portion in said secondary circuit for engaging said armature to provide thereby a reluctance space element between said armature and said unencircled portion of said central member pole face.

OSCAR A. MORGENSTERN.